United States Patent
Izumi et al.

(10) Patent No.: US 12,328,026 B2
(45) Date of Patent: *Jun. 10, 2025

(54) BATTERY MANAGEMENT SYSTEM AND BATTERY MANAGEMENT METHOD

(71) Applicant: TOYOTA JIDOSHA KABUSHIKI KAISHA, Toyota (JP)

(72) Inventors: Junta Izumi, Nagoya (JP); Kenji Kimura, Nagoya (JP); Masakazu Habu, Toyota (JP); Masanosuke Sufu, Toyota (JP); Makito Muramatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 645 days.

This patent is subject to a terminal disclaimer.

(21) Appl. No.: 17/695,897

(22) Filed: Mar. 16, 2022

(65) Prior Publication Data
US 2022/0311261 A1  Sep. 29, 2022

(30) Foreign Application Priority Data
Mar. 23, 2021 (JP) ................... 2021-048292

(51) Int. Cl.
*H02J 7/00* (2006.01)
*H02J 7/02* (2016.01)

(52) U.S. Cl.
CPC ........ *H02J 7/00712* (2020.01); *H02J 7/0013* (2013.01); *H02J 7/0031* (2013.01);
(Continued)

(58) Field of Classification Search
CPC .......... H02J 3/32; H02J 3/381; H02J 2300/30; H02J 2300/24; H02J 2207/20; H02J 3/38;
(Continued)

(56) References Cited

U.S. PATENT DOCUMENTS

| | | | |
|---|---|---|---|
| 7,948,207 B2 | 5/2011 | Scheucher | |
| 8,996,241 B2 | 3/2015 | Uchida | |

(Continued)

FOREIGN PATENT DOCUMENTS

| | | | |
|---|---|---|---|
| EP | 2 645 515 A2 | 10/2013 | |
| EP | 3 817 184 A1 | 5/2021 | |

(Continued)

OTHER PUBLICATIONS

Sep. 23, 2024 Office Action issued in U.S. Appl. No. 17/681,172.
(Continued)

*Primary Examiner* — Binh C Tat
(74) *Attorney, Agent, or Firm* — Oliff PLC

(57) ABSTRACT

The battery cellar includes a storage cabinet that stores a plurality of batteries, a power converter (an AC/DC converter and a DC/DC converter) electrically connected between the plurality of batteries stored in the storage cabinet and a power system to perform a bidirectional power conversion operation, and a server that controls the power converter to charge or discharge the plurality of batteries in response to a DR request from the power system. The server, based on a level of demand determined in accordance with a rank related to a degradation degree of a battery, suppresses the charging/discharging of a battery with a higher demand rank among the plurality of batteries as compared with the charging/discharging of a battery with a lower demand rank among the plurality of batteries.

6 Claims, 11 Drawing Sheets

(52) U.S. Cl.
CPC ............ *H02J 7/0048* (2020.01); *H02J 7/005* (2020.01); *H02J 7/02* (2013.01); *H02J 2207/20* (2020.01)

(58) Field of Classification Search
CPC .. H02J 7/0013; H02J 2300/20; H02J 2300/28; H02J 7/06; H02J 7/345; H02J 3/26; H02J 7/0042; H02J 7/02; H02J 13/00002; H02J 13/00004; H02J 13/00034; H02J 15/00; H02J 2300/10; H02J 2310/12; H02J 2310/60; H02J 3/00; H02J 3/14; H02J 3/322; H02J 3/388; H02J 3/46; H02J 7/35; H02J 9/061; H02J 7/0031; H02J 7/0048; H02J 7/005; H02J 7/00712; H02J 7/007188; H01M 2220/20; H01M 50/528; G01R 19/2513
USPC .................................................. 320/132–139
See application file for complete search history.

(56) References Cited

U.S. PATENT DOCUMENTS

| | | | |
|---|---|---|---|
| 10,044,069 B2* | 8/2018 | Despesse | ............. H02J 7/0024 |
| 2011/0140648 A1 | 6/2011 | Lee | |
| 2011/0218703 A1 | 9/2011 | Uchida | |
| 2012/0249057 A1 | 10/2012 | Abe et al. | |
| 2013/0030739 A1 | 1/2013 | Takahashi et al. | |
| 2013/0285612 A1 | 10/2013 | Okuda | |
| 2015/0171641 A1 | 6/2015 | Sato | |
| 2015/0349387 A1 | 12/2015 | Inaba et al. | |
| 2016/0109916 A1 | 4/2016 | Li et al. | |
| 2017/0205861 A1 | 7/2017 | Matsuda | |
| 2017/0366023 A1 | 12/2017 | Tanaka et al. | |
| 2019/0305386 A1* | 10/2019 | Lee | ...................... G01R 31/392 |
| 2020/0176983 A1 | 6/2020 | Yasoshima et al. | |
| 2020/0200826 A1 | 6/2020 | Izumi et al. | |
| 2020/0209319 A1 | 7/2020 | Mitsui et al. | |
| 2021/0168964 A1 | 6/2021 | Nakaya | |
| 2021/0249701 A1 | 8/2021 | Shine et al. | |
| 2021/0265850 A1 | 8/2021 | Okino | |
| 2022/0196753 A1 | 6/2022 | Tong | |
| 2022/0305925 A1* | 9/2022 | Izumi | ...................... B60L 58/10 |
| 2022/0308120 A1* | 9/2022 | Izumi | .................... G01R 31/385 |
| 2022/0311063 A1 | 9/2022 | Izumi et al. | |
| 2022/0311248 A1* | 9/2022 | Izumi | ...................... H02J 7/005 |

FOREIGN PATENT DOCUMENTS

| | | |
|---|---|---|
| JP | 2010-066229 A | 3/2010 |
| JP | 2013-211944 A | 10/2013 |
| JP | 2015-186290 A | 10/2015 |
| JP | 2016-117354 A | 6/2016 |
| JP | 2017-229137 A | 12/2017 |
| JP | 2018-205873 A | 12/2018 |
| WO | 2011/125213 A1 | 10/2011 |
| WO | 2013/129499 A1 | 9/2013 |
| WO | 2016/051701 A1 | 4/2016 |
| WO | 2019/181659 A1 | 9/2019 |
| WO | 2020/004053 A1 | 1/2020 |

OTHER PUBLICATIONS

Dec. 6, 2024 Office Action issued in U.S. Appl. No. 17/699,640.
Oct. 1, 2024 Office Action issued in U.S. Appl. No. 17/694,776.
Jan. 13, 2025 Notice of Allowance issued in U.S. Appl. No. 17/681,172.
Sep. 23, 2022 Office Action issued in U.S. Appl. No. 17/689,125.
Mar. 20, 2023 Office Action issued in U.S. Appl. No. 17/689,125.

* cited by examiner

| BATTERY ID | MODEL NUMBER | PRODUCTION DATE | SOC | FULL CHARGE CAPACITY | RANK | DEGRADATION EVALUATION TIME | STORAGE POSITION |
|---|---|---|---|---|---|---|---|
| | | | | | | | |
| | | | | | | | |
| | | | | | | | |
| ⋮ | | | | | | | |

BATTERY MANAGEMENT SYSTEM AND BATTERY MANAGEMENT METHOD

This non-provisional application is based on Japanese Patent Application No. 2021-048292 filed on Mar. 23, 2021 with the Japan Patent Office, the entire contents of which are hereby incorporated by reference.

BACKGROUND

Field

The present disclosure relates to a battery management system and a battery management method.

Description of the Background Art

Japanese Patent Laying-Open No. 2018-205873 describes that a user of a battery electric vehicle equipped with a battery suitable for an electric power storage system is prompted to replace the battery.

SUMMARY

In recent years, vehicles equipped with battery packs for driving have been spread rapidly. Therefore, the number of used batteries recovered along with the repurchase of new vehicles and the dismantling of used vehicles are increasing. From the viewpoint of promoting sustainable development goals (SDGs), it is desired to recycle the used batteries by recovering the used batteries and manufacturing a new battery pack from the recovered used batteries. However, the present inventors have found that recycling the used batteries may confront the following problems.

Batteries are stored in a distribution center or the like before sold. It is costly to properly store batteries. In addition, the batteries may be stored in the distribution center for a certain period (storage period) before they are shipped out of the distribution center. Therefore, it is desirable to effectively utilize the batteries during the storage period.

The batteries may be ranked according to their degradation degrees. Different ranks of batteries may be used in different applications or the like. Therefore, a battery may have a higher demand rank, and a battery may have a lower demand rank. It is desirable to stock a certain number of batteries for each rank in the battery management system in accordance with the demand of use. However, the battery management system cannot adjust the ranks of batteries to be recovered from the market. In addition, the degradation of batteries in the battery management system may progress during the storage period, which may lower the ranks of batteries.

The present disclosure has been made in order to solve the aforementioned problems, and an object of the present disclosure is to stock various ranks of batteries in accordance with the demand of use and effectively utilize the batteries during a storage period.

(1) A battery management system according to an aspect of the present disclosure includes a storage cabinet that stores a plurality of batteries, a power converter electrically connected between the plurality of batteries stored in the storage cabinet and a power system, and a controller that controls the power converter in response to a demand response request from the power system to charge or discharge the plurality of batteries. The controller, based on a level of demand determined in accordance with a rank related to a degradation degree of a battery, suppresses the charging/discharging of a first battery as compared with the charging/discharging of a second battery, the first battery is a battery with a higher demand rank among the plurality of batteries, and the second battery is a battery with a lower demand rank among the plurality of batteries.

(2) The controller reduces an amount of charging/discharging power of the first battery within a predetermined period smaller than an amount of charging/discharging power of the second battery within the predetermined period.

(3) The controller reduces a charging/discharging frequency of the first battery smaller than a charging/discharging frequency of the second battery.

(4) The battery management system further includes a switch that electrically connects each of the plurality of batteries to or electrically disconnects each of the plurality of batteries from the power system. The controller controls the switch to electrically disconnect the first battery from the power system.

According to the configurations (1) to (4), the charging/discharging of the first battery is suppressed as compared with the charging/discharging of the second battery. More specifically, the amount of charging/discharging power or the charging/discharging frequency of the first battery is reduced lower than the second battery. Alternatively, the first battery is electrically disconnected from the power system. Thus, the charging/discharging of the first battery is suppressed in response to the demand response request from the power system, which makes it possible to suppress the battery degradation due to the charging/discharging of the battery. As a result, it is possible to maintain the battery at a higher demand rank, which makes it possible to stock various ranks of batteries in accordance with the demand of use.

(5) The controller suppresses the charging/discharging of the first battery as compared with the charging/discharging of the second battery when an SOC of the first battery is within a predetermined SOC range in which the progress of degradation of the first battery is suppressed.

If the SOC of the battery is beyond the SOC range mentioned above, the degradation of a battery may progress during the storage period even if the charging/discharging of the first battery is suppressed. According to the configuration (5) mentioned above, when the SOC of the first battery is within the predetermined SOC range in which the progress of degradation of the first battery is suppressed, the charging/discharging of the first battery is suppressed. Thus, the progress of degradation of the first battery is suppressed during the storage period, which makes it possible to reliably maintain the battery at a higher demand rank.

(6) The controller suppresses the charging/discharging of a third battery which has been sold to a customer as compared with the charging/discharging of a fourth battery which is not sold to a customer, and the third battery and the fourth battery have the same rank.

According to the configuration (6), the charging/discharging of the third battery which has been sold to a customer is suppressed as compared with the fourth battery which is not sold to a customer. Thus, it is possible to suppress the progress of degradation of a battery during the storage period until the battery is sold out. Therefore, it is possible to maintain the rank of the battery until its customer is determined.

(7) A battery management method according to another aspect of the present disclosure is a battery management method using a server. The method includes causing the server to charge and discharge a plurality of batteries stored in a storage cabinet in response to a demand response request from the power system. In the step of causing the server to charge or discharge a plurality of batteries, the server is caused to suppress, based on a level of demand determined in accordance with a rank related to a degradation degree of a battery, the charging/discharging of a battery with a higher demand rank among the plurality of batteries as compared with the charging/discharging of a battery with a lower demand rank among the plurality of batteries.

According to the method (7), similarly to the configuration (1), it is possible to stock various ranks of batteries in accordance with the demand of use.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
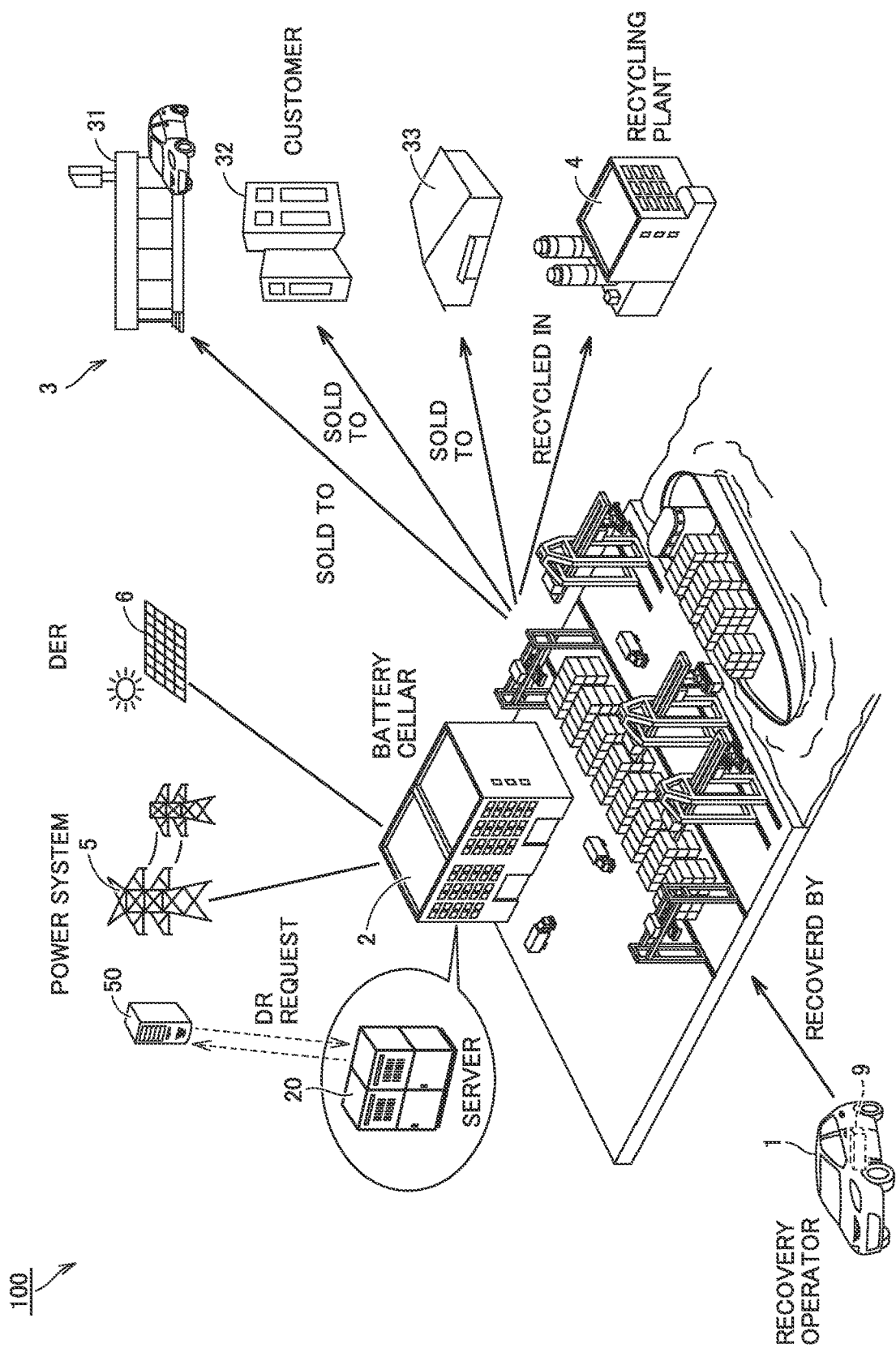
FIG. 1 is a diagram illustrating an example distribution model of a battery pack according to the present embodiment.

In the embodiments of the present disclosure, the charging/discharging of a battery means at least one of the charging or the discharging of the battery. In other words, the charging/discharging of a battery is not limited to both the charging and the discharging of the battery, it may be the charging of the battery alone or the discharging of the battery alone.

In the embodiments of the present disclosure, a battery pack includes a plurality of modules (also referred to as blocks or stacks). The plurality of modules may be connected in series or may be connected in parallel to each other. Each module includes a plurality of cells (single cells).

Generally, "recycling" of a battery pack is roughly classified into reuse, rebuild, and material recycling of the battery pack. In the case of reuse, a recovered battery pack is shipped out as it is as a reuse product after necessary inspections. In the case of rebuilt, the recovered battery pack is firstly dismantled into modules, and usable modules (modules that may be used after performance recovery) among the dismantled modules are combined to manufacture a new battery pack. The manufactured new battery pack is shipped out as a rebuilt product after necessary inspections. On the other hand, in the case of material recycling, any recyclable materials (resources) are recycled from each cell, and the recovered battery pack is not used to manufacture a new battery pack.

In the embodiments described below, the battery pack recovered from the vehicle is firstly dismantled into modules. Then, various processes are performed on each module. In other words, in the following description, a recyclable used battery means a rebuildable module. However, it is not necessary to dismantle a battery pack into modules. Depending on the configuration or the degradation degree of a battery pack, the battery pack may be reused without being dismantled into modules.

Hereinafter, embodiments of the present disclosure will be described in detail with reference to the drawings. In the drawings, the same or corresponding portions are denoted by the same reference numerals, and the description thereof will not be repeated.

EMBODIMENTS

<Battery Distribution Model>

FIG. 1 is a diagram illustrating an example distribution model of a battery pack according to the present embodiment. Hereinafter, the example distribution model illustrated in FIG. 1 will be referred to as the "battery distribution model". The battery distribution model 100 includes a recovery operator 1, a battery cellar 2, a customer 3, a recycling plant 4, a power system 5, and a distributed energy resource (DER) 6.

The recovery operator 1 recovers used battery packs (used batteries 9) from a plurality of vehicles. The recovery operator 1 may be a vehicle dealer or a vehicle dismantling operator. In the present embodiment, each used battery 9 is attached with identification information (battery ID) (see FIG. 5). Therefore, in the battery distribution model 100, the battery ID may be used to identify a used battery 9, manage data of a used battery 9 (battery data to be described later), and track a used battery 9 in the distribution path.

The battery cellar 2 is a facility for appropriately storing the used batteries 9 recovered by the recovery operator 1, which is similar to a wine cellar for storing bottles of wine under a controlled temperature and humidity. In the example illustrated in FIG. 1, the battery cellar 2 is arranged in a distribution center near a harbor. The battery cellar 2 includes a server 20 for managing data related to the used batteries 9, and a plurality of storage cabinets 21. The battery cellar 2 corresponds to the "battery management system"

according to the present disclosure. The batteries stored in the battery cellar 2 are not limited to the used batteries, and may include new batteries.

Figure 2:
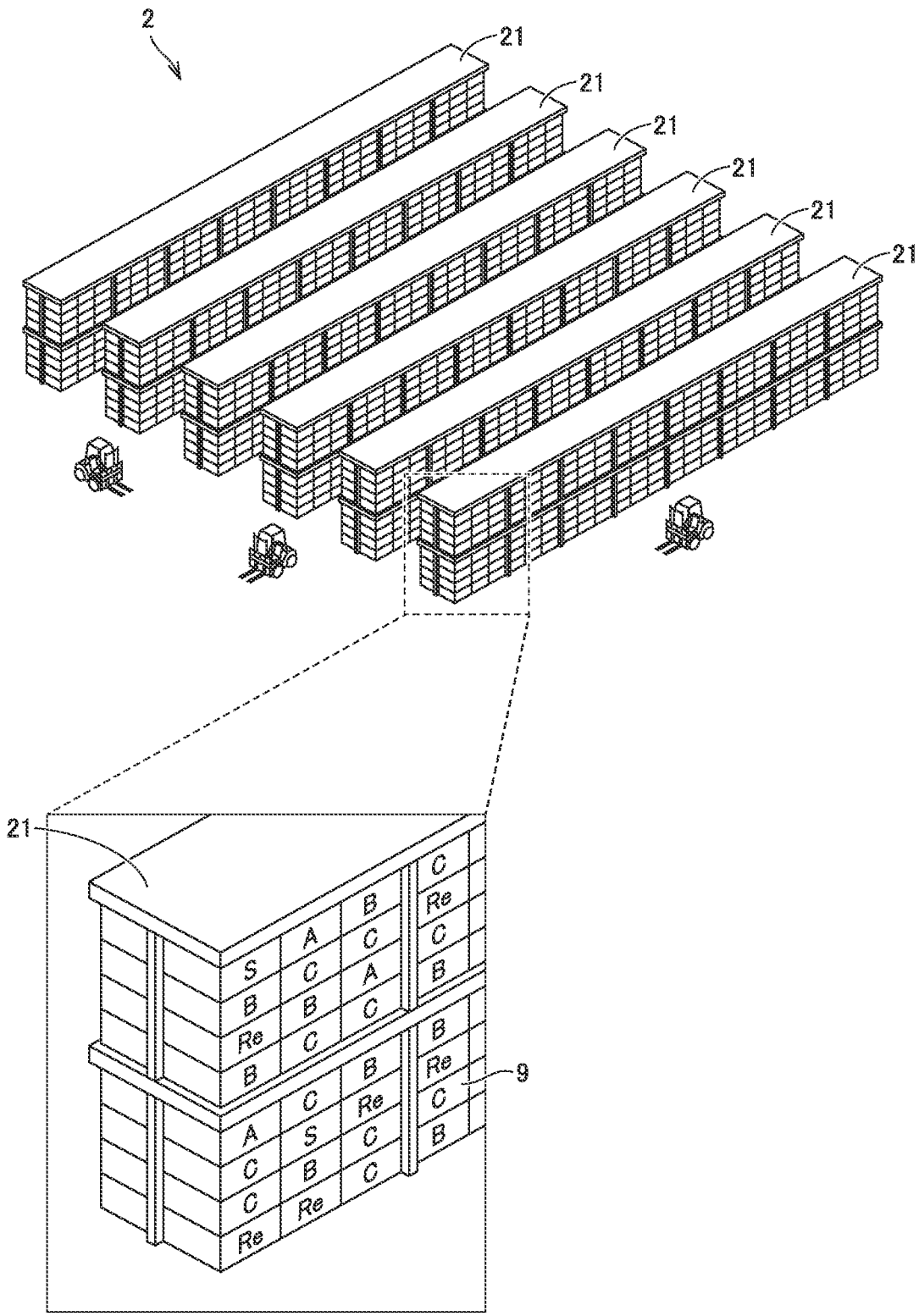
FIG. 2 is a diagram illustrating an example in which used batteries are stored in a storage cabinet.

FIG. 2 is a diagram illustrating an example in which the used batteries 9 are stored in the storage cabinet 21. As illustrated in FIG. 2, a plurality of storage cabinets 21 are arranged in a building of the battery cellar 2. Each of the plurality of storage cabinets 21 is configured to store a number of used batteries 9. Although the details will be described later, in the present embodiment, the battery cellar 2 performs a degradation evaluation test on each of the used batteries 9 stored in the storage cabinet 21. Then, based on the result of the degradation evaluation test, the battery cellar 2 determines whether each used battery 9 is recyclable or not (whether each used battery 9 is suitable for recycle or not).

Referring back to FIG. 1, the customer 3 purchases the used batteries 9 determined to be recyclable from the battery cellar 2. The customer 3 may include a vendor 31 who sells the used battery 9 as a vehicular battery, and a user 32 who uses the used battery 9 as a stationary battery in a factory, building, or the like. In addition, the customer 3 may include a vendor 33 who sells the used battery 9 as a service component (such as a maintenance or repair component).

The recycling plant 4 recycles materials of a used battery 9 which is determined to be unrecyclable by the battery cellar 2 as raw materials of another product.

The power system 5 is a power network constructed by a power plant, a power transmission and distribution facility, or the like. In the present embodiment, an electric power company serves as both a power generation company and a power transmission and distribution company. The electric power company function as a general electric power transmission and distribution operator and as an administrator who manages and maintains the power system 5. The power system 5 includes a company server 50. The company server 50 is owned by the electric power company, and is configured to manage the supply and demand of electric power of the power system 5. The server 20 and the company server 50 are configured to communicate with each other in both directions.

The DER 6 is a smaller electric power facility which is provided in a distribution center (or a peripheral area thereof) where the battery cellar 2 is arranged. The DER 6 is capable of transmitting electric power to or receiving electric power from the battery cellar 2. The DER 6 includes, for example, a power generation DER and a power storage DER.

The power generation DER may be a naturally fluctuating power source or a generator. The naturally fluctuating power source is such a power facility that the power output thereof fluctuates depending on weather conditions. Although FIG. 1 illustrates a solar power facility (a solar panel), the naturally fluctuating power source may be a wind power facility instead of or in addition to the solar power facility. On the other hand, the generator is a power facility independent of weather conditions. The generator may be a steam turbine generator, a gas turbine generator, a diesel engine generator, a gas engine generator, a biomass generator, a stationary fuel cell, or the like. The generator may be a cogeneration system that utilizes heat generated during the generation of electric power.

The storage DER may be a power storage system or a heat storage system. The power storage system is a stationary power storage device that stores electric power generated by the naturally fluctuating power source or the like. The power storage system may be a power-to-gas apparatus that uses the electrical power to produce gaseous fuels (such as hydrogen or methane). The heat storage system includes a heat storage tank provided between a heat source and a load and configured to temporarily store a liquid medium in the heat storage tank in a heated state. The heat storage system may be used to offset the heat generation and the heat consumption in time. Therefore, for example, heat generated by the heat source device by consuming the electric power during the nighttime may be stored in the heat storage tank, and the stored heat may be used to perform air conditioning during the daytime.

As described above, the used batteries 9 recovered by the recovery operator 1 are stored in the battery cellar 2 before they are shipped to the customer 3 or recycled in the recycling plant 4. Since maintenance cost (running cost) is required to appropriately store the used batteries 9 in the battery cellar 2, and the recovered used batteries 9 may be stored in the battery cellar 2 for a certain period before they are sold to the customer 3 or recycled in the recycling plant 4, it is desirable to effectively utilize the used batteries 9 stored in the battery cellar 2 during the storage period.

In the present embodiment, in addition to the storage of the used batteries 9, the battery cellar 2 functions as a virtual power plant (VPP). Thus, the charging/discharging of the used batteries 9 includes both the degradation evaluation of the used batteries 9 for determining the recycle mode of the used batteries 9 and the power supply and demand adjustment of the power system 5 using the used batteries 9. As a result, in the battery cellar 2, the storage of the used batteries 9, the degradation evaluation of the used batteries 9, and the power demand and demand adjustment using the used batteries 9 are performed in an integrated manner.

<Reuse of Battery>

Figure 3:
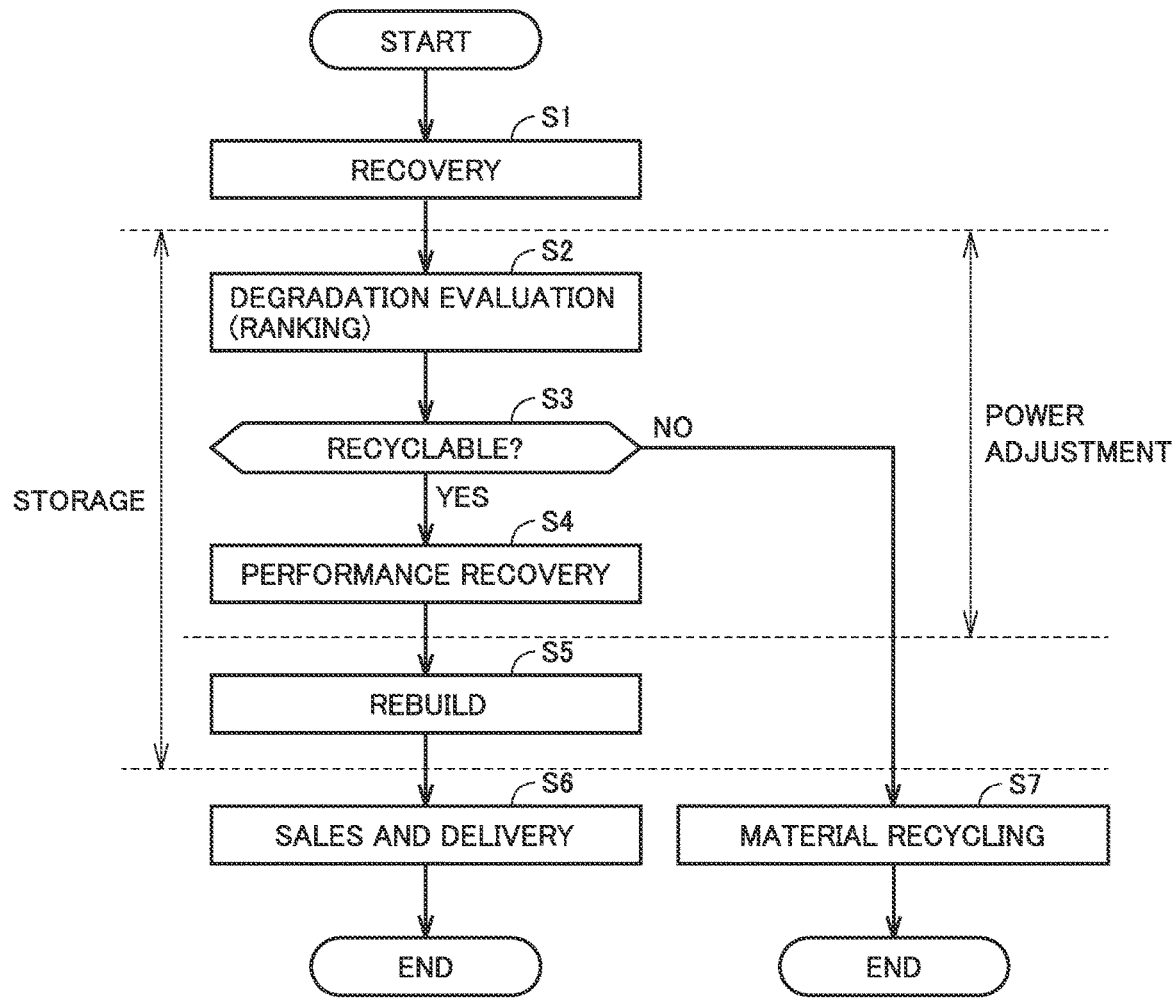
FIG. 3 is a flowchart schematically illustrating a process of recycling a used battery.

FIG. 3 is a flowchart schematically illustrating a process of recycling the used batteries 9. First, the used batteries 9 are recovered by the recovery operator 1 and delivered to the battery cellar 2 (S1).

In the present embodiment, the server 20 performs a degradation evaluation test (performance inspection) on each of the used batteries 9 stored in the storage cabinet 21 (S2). The server 20 evaluates the degradation degree of each used battery 9 based on electrical characteristics such as a full charge capacity and an internal resistance (such as an AC impedance). Then, the server 20 determines whether each used battery 9 is recyclable or not based on the result of the degradation evaluation test (S3).

In the present embodiment, the used batteries 9 are ranked based on the result of the degradation evaluation test (more specifically, the measurement result of the full charge capacity). For example, as illustrated in FIG. 2, the used batteries 9 that may be rebuilt are ranked in the descending order of the full charge capacity into four ranks: rank S, rank A, rank B, and rank C. Thus, the trade price of each used battery 9 may be determined in association with the rank thereof, and the quality of each used battery 9 may be guaranteed in association with the rank thereof. Therefore, the used batteries 9 may be smoothly distributed from the battery cellar 2 to the market. A used battery 9, the full charge capacity of which is less than a prescribed value, is ranked lower than rank C (represented as Re), and is transported to the material recycling.

If it is determined that the used battery 9 is recyclable (YES in S3), the procedure proceeds to the performance recovery step (S4). In the performance recovery step, a process (performance recovery process) is performed on the used battery 9 so as to recover the performance thereof. For example, the full charge capacity of a used battery 9 may be recovered by overcharge the used battery 9. However, the performance recovery step may be omitted. Based on the result of the degradation evaluation test, the performance recovery step may be performed on a used battery 9 which has a large degradation degree (the performance thereof is greatly reduced), whereas the performance recovery step may not be performed on a used battery 9 which has a small degradation degree (the performance thereof is not greatly reduced).

Subsequently, a new battery pack is manufactured (rebuilt) using the used batteries 9, the performance of which has been recovered in the performance recovery step (S5). The new battery pack is basically rebuilt from the used batteries 9, the performance of which has been recovered in the performance recovery step, and may include a used battery 9, the performance of which is not recovered in the performance recovery step, or a new battery (a new module). Thereafter, the battery pack is sold and shipped to the customer 3 (S6).

If it is determined that the used battery 9 is not recyclable based on the result of the degradation evaluation test (NO in S3), the used battery 9 is transported to the recycling plant 4 (S7). In the recycling plant 4, the used battery 9 is dismantled and materially recycled.

As described above, after the used batteries 9 are recovered by the recovery operator 1, the used batteries 9 are stored in the battery cellar 2 until they are shipped to the customer 3 or transported to the recycling plant 4. During the storage period, the degradation evaluation test is performed on each used battery 9. In order to measure the electrical characteristics such as the full charge capacity of the used battery 9 in the degradation evaluation test, the used battery 9 is charged or discharged. In the present embodiment, the electric power exchanged between the battery cellar 2 (and the DER 6) and the power system 5 is used to charge or discharge the used battery 9. Thus, the battery cellar 2 functions as a VPP (or a DER) and contributes to the load leveling of the power system 5. More specifically, during a time period when the power system 5 has a power surplus as compared with the power demand, the battery cellar 2 uses the power surplus to charge the used batteries 9 so as to absorb the power surplus. On the other hand, during a time period when the power system 5 has a power shortage as compared with the power demand, the battery cellar 2 discharges the used batteries 9 so as to compensate the power shortage.

However, the battery cellar 2 may not be configured to absorb the power surplus and compensate the power shortage of the power system 5. The battery cellar 2 may be configured to absorb the power surplus only or to compensate the power shortage only. For example, the battery cellar 2 may be configured to charge the used battery 9 with the power surplus of the power system 5, and may be configured to discharge the electric power from the used batteries 9 to a power destination different from the power system 5. The battery cellar 2 may be configured to discharge the electric power from the used batteries 9 to, for example, the DER 6 only.

<Electrical Configuration of Battery Cellar>

Figure 4:
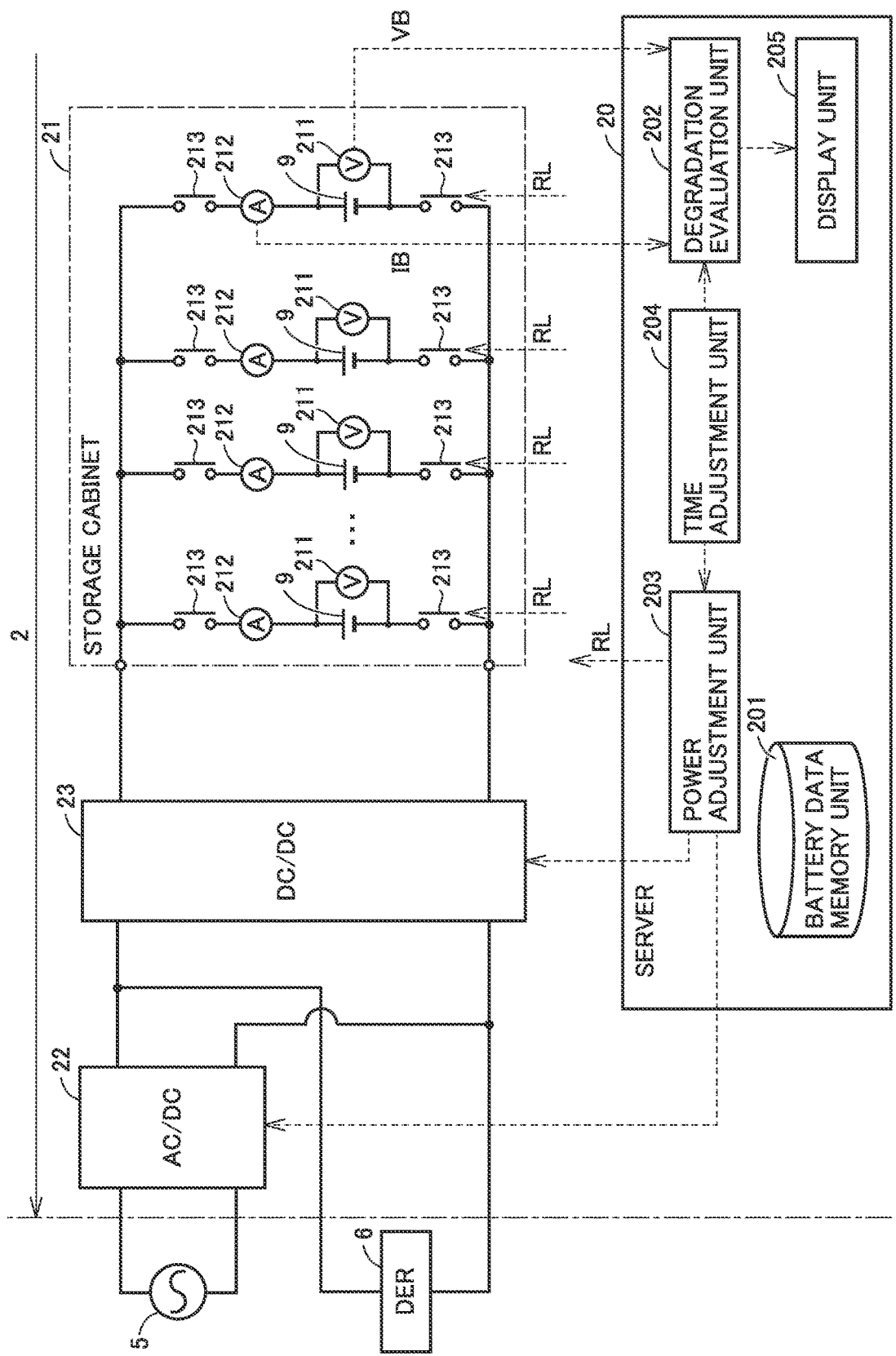
FIG. 4 is a diagram illustrating an electrical configuration of a battery cellar.

FIG. 4 is a diagram illustrating an electrical configuration of the battery cellar 2. The battery cellar 2 includes, for example, a storage cabinet 21, an AC/DC converter 22, a DC/DC converter 23, and a server 20. Although only one storage cabinet 21 is illustrated in FIG. 4 due to the limitation of paper space, a typical battery cellar 2 may include a plurality of storage cabinets 21 as illustrated in FIG. 2.

The storage cabinet 21 stores a plurality of used batteries 9. Although in FIG. 4 the plurality of used batteries 9 are connected in parallel to each other, it is merely an example, and the connection of the plurality of used batteries 9 is not particularly limited. For example, the plurality of used batteries 9 may be connected in series, or may be connected via a combination of serial connection and parallel connection. The storage cabinet 21 includes a voltage sensor 211, a current sensor 212, and a relay 213.

The voltage sensor 211 detects a voltage VB of the used battery 9, and outputs the detected voltage to the server 20. The current sensor 212 detects a current IB of the used battery 9, and outputs the detected current to the server 20. If the temperature is used in the degradation evaluation of the used battery 9, the storage cabinet 21 may further include a temperature sensor (not shown). Each sensor may be installed in each used battery 9.

The relay 213 includes, for example, a first relay electrically connected to a positive electrode of each used battery 9 and a second relay electrically connected to a negative electrode of each used battery 9. The relay 213 is configured to switch an electrical connection between each used battery 9 and the power system 5. Thus, an arbitrary used battery 9 may be electrically disconnected from the power system 5 during the charging/discharging of the other used batteries 9 so as to take the used battery 9 out of the storage cabinet 21. The relay 213 corresponds to the "switch" according to the present disclosure.

The AC/DC converter 22 is electrically connected between the power system 5 and the DC/DC converter 23. The AC/DC converter 22 is configured to perform a bidirectional power conversion operation so as to charge or discharge the used battery 9 stored in the storage cabinet according to a control command (charging/discharging command) from the server 20. More specifically, the AC/DC converter 22 converts AC power supplied from the power system 5 into DC power, and charges the used battery 9 with the DC power. The AC/DC converter 22 converts DC power discharged from the used battery 9 into AC power, and supplies the AC power to the power system 5.

The DC/DC converter 23 is electrically connected between the AC/DC converter 22 and the storage cabinet 21, and is also electrically connected between the DER 6 and the storage cabinet 21. Similar to the AC/DC converter 22, the DC/DC converter 23 is configured to perform a bidirectional power conversion operation according to a control command (charging/discharging command) from the server 20.

The DC/DC converter 23 may charge the used battery 9 with the DC power supplied from the AC/DC converter 22 and/or the DER 6, and may discharge the DC power stored in the used battery 9 to the AC/DC converter 22 and/or the DER 6.

The server 20 includes a processor such as a CPU (Central Processing Unit), a memory such as a ROM (Read Only Memory) and a RAM (Random Access Memory), and input/output ports (none of which is shown) through which various signals are input/output. The server 20 performs various controls based on signals received from the sensors as well as programs and maps stored in the memory. The server 20 includes a battery data memory unit 201, a degradation evaluation unit 202, a power adjustment unit 203, a time adjustment unit 204, and a display unit 205.

The battery data memory unit 201 stores battery data to be used for managing the used batteries 9 in the battery cellar 2.

Figures 5, 6:
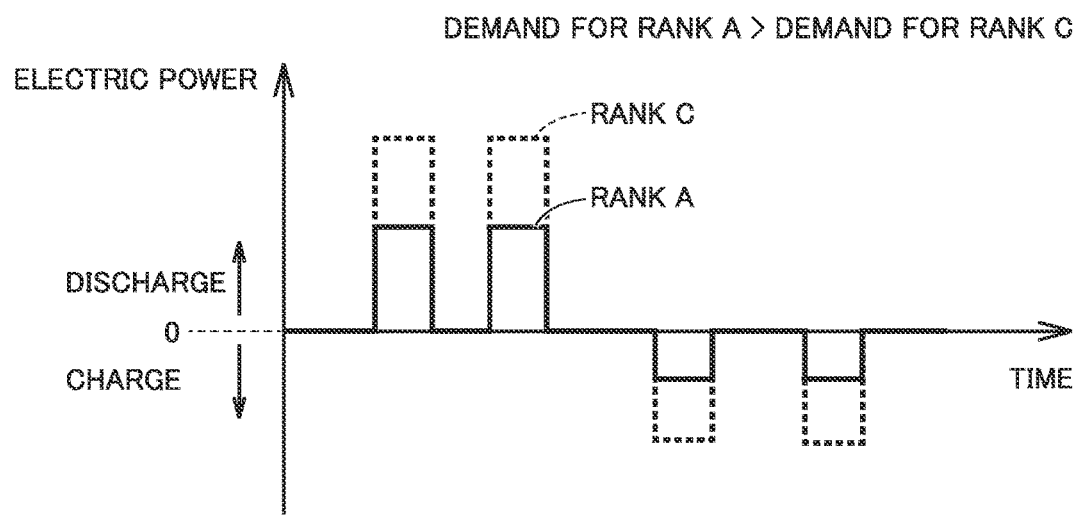
FIG. 5 is a diagram illustrating an example data structure of a battery.
FIG. 6 is a conceptual diagram illustrating an example mode of suppressing the charging/discharging of a used battery according to the present embodiment.

FIG. 5 is a diagram illustrating an example data structure of a used battery 9. The battery data is stored in the format of a map, for example. The battery data includes, as parameters, for example, identification information (battery ID) for identifying the used battery 9, a model number of the used battery 9, a production date, a current SOC (State Of Charge), a full charge capacity, a rank, a degradation evaluation time (the latest time at which the degradation evaluation test is performed), and a storage position (identification information of a storage cabinet in which the used battery 9 is stored). The battery data may include other parameters than those mentioned above, such as an internal resistance of the used battery 9, or an index ΣD indicating the deviation of salt concentration distribution in the electrolytic solution of the used battery 9.

Referring again to FIG. 4, the degradation evaluation unit 202 performs a degradation evaluation test on each used battery 9 based on the voltage VB detected by the voltage sensor 211 and the current IB detected by the current sensor 212 during the charging/discharging of the used battery 9. An example evaluation method will be described with reference to FIG. 12. The degradation evaluation unit 202 ranks the used battery 9 based on the result of the degradation evaluation test.

The power adjustment unit 203 adjusts the electric power exchanged between the battery cellar 2 (and the DER 6) and the power system 5. More specifically, the server 20 selects a used battery 9 to be charged or discharged from the plurality of used batteries 9 according to a demand response (DR) request from the company server 50 (see FIG. 1). In order to charge or discharge the selected used battery 9, the power adjustment unit 203 sends a command to the relay 213, the AC/DC converter 22 and the DC/DC converter 23. An example control method will be described with reference to FIG. 13.

The time adjustment unit 204 adjusts a time at which the degradation evaluation unit 202 performs a degradation evaluation test on a used battery 9 and a time at which the power adjustment unit 203 adjusts the electric power exchanged between the battery cellar 2 and the power system 5. More specifically, the time adjustment unit 204 performs the time adjustment so that the degradation evaluation test of the used battery 9 is performed at a time in synchronization with the time at which the used battery 9 in the battery cellar 2 is charged or discharged in response to the DR request from the company server 50. In addition to the degradation evaluation test, the performance recovery process (see S4 in FIG. 3) may be performed at a time in synchronization with the time at which the used battery 9 in the battery cellar 2 is charged or discharged in response to the DR request from the company server 50.

The display unit 205 displays the battery data (see FIG. 5) in response to an instruction from an administrator of the battery cellar 2 (or an employee of the battery cellar 2). The display unit 205 also displays the progress and results of the degradation evaluation test performed by the degradation evaluation unit 202. Thus, the administrator may understand the progress and results of the degradation evaluation test. Further, the display unit 205 displays the charging/discharging conditions of the used battery 9 selected by the power adjustment unit 203. Thus, the administrator may understand the result of the power adjustment between the battery cellar 2 and the power system 5.

The server 20 corresponds to the "controller" according to the present disclosure. The AC/DC converter 22 and the DC/DC converter 23 correspond to the "power converter" according to the present disclosure.

<Stock of Batteries>

Different ranks of batteries may be used in different applications or the like. Therefore, a battery may have a higher demand rank, and a battery may have a lower demand rank. It is desirable to stock a certain number of the used batteries 9 for each rank in the battery cellar 2 in accordance with the demand of use. However, the battery cellar 2 cannot adjust the ranks of the used batteries 9 to be recovered from the market. In addition, the degradation of each used battery 9 in the battery cellar 2 may progress during the storage period, which may lower the rank of each used battery. In particular, since each used battery 9 stored in the battery cellar 2 is repeatedly charged or discharged so as to adjust the electric power between the battery cellar 2 and the power system 5, the used battery 9 degrades faster.

Therefore, in the present embodiment, the server 20 obtains a predicted level of demand for each rank of the used batteries 9 based on the sales result of each rank or the like. Then, the server 20 suppresses the charging/discharging of a used battery 9 with a higher demand rank as compared with the charging/discharging of a used battery 9 with a lower demand rank. Thus, it is possible to suppress the degradation of the used battery 9 caused by the charging/discharging, which makes it possible to maintain the used battery 9 at a higher demand rank. As a result, it is possible to stock a large amount of the used batteries 9 as hot selling products.

Figure 7:
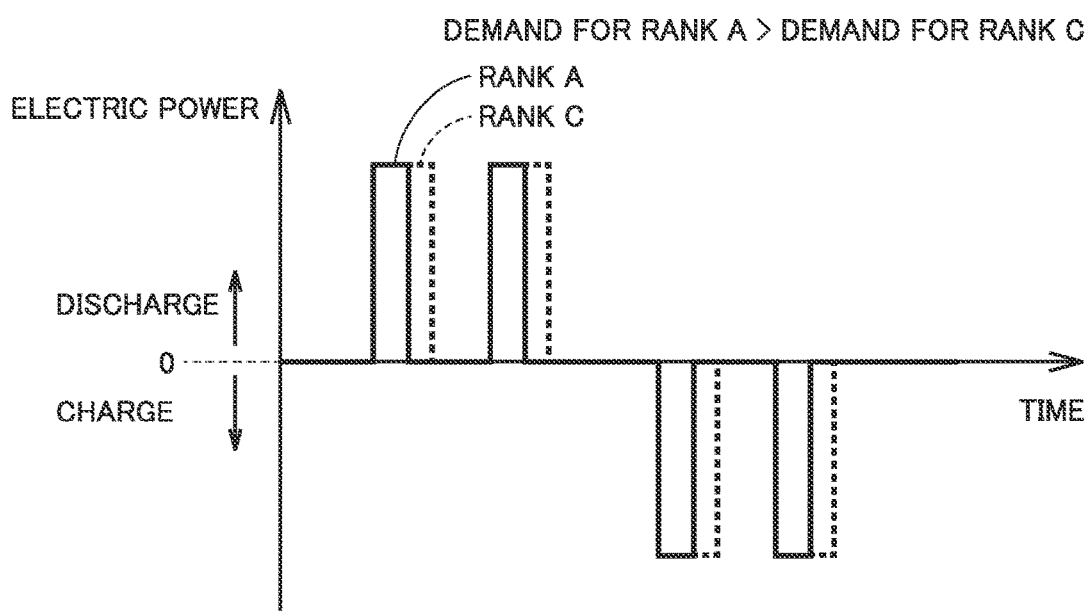
FIG. 7 is a conceptual diagram illustrating another example mode of suppressing the charging/discharging of a used battery according to the present embodiment.
Figure 8:
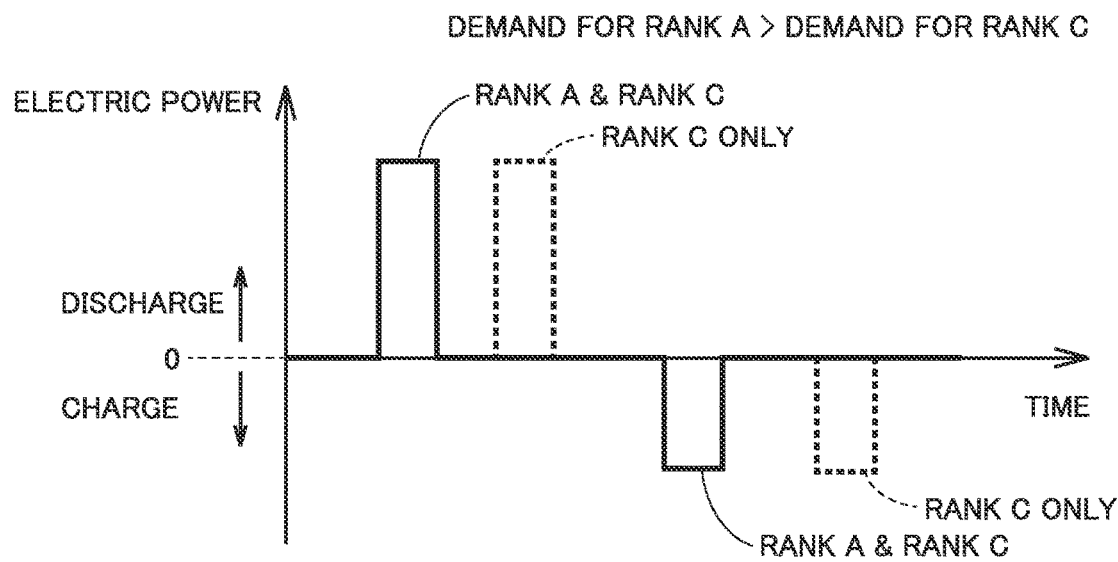
FIG. 8 is a conceptual diagram illustrating still another example mode of suppressing the charging/discharging of a used battery according to the present embodiment.

FIG. 6 is a conceptual diagram illustrating an example mode of suppressing the charging/discharging of a used battery 9 in the present embodiment. FIG. 7 is a conceptual diagram illustrating another example mode of suppressing the charging/discharging of a used battery 9 in the present embodiment. FIG. 8 is a conceptual diagram illustrating still another example mode of suppressing the charging/discharging of a used battery 9 in the present embodiment. In FIGS. 6 to 8, the horizontal axis represents elapsed time, and the vertical axis represents electric power charged from the power system 5 to the battery cellar 2 (the used batteries 9) or discharged from the battery cellar 2 (the used batteries 9) to the power system 5.

As an example, it is assumed that among the ranks S to C, the level of demand for the rank A is the highest and the level of demand for the rank C is the lowest. As illustrated in FIG. 6, it is possible to reduce the amount of charging/discharging power (the amount of electric power to be charged or discharged) of the used batteries 9 with a higher demand rank A smaller than the amount of charging/discharging power of the used batteries 9 with a lower demand rank C within a predetermined period (a first control). In the present embodiment, the method of decreasing the amount of charging/discharging power within the predetermined period is not limited to a method of adjusting the amount of charging/discharging power (such as a peak value) (see FIG. 6), and may be a method of adjusting the length of charging/discharging period as illustrated in FIG. 7. It is also possible to adjust both the amount of charging/discharging power and the length of charging/discharging period. Further, as illustrated in FIG. 8, it is possible to reduce the charging/discharging frequency of the used batteries 9 with a higher demand rank A lower than the charging/discharging frequency of the used batteries 9 with a higher demand rank C (a second control). Although not shown, both the amount of charging/discharging power and the charging/discharging frequency of the used batteries 9 with the rank A may be suppressed as compared with those of the used battery 9 with the rank C. In other words, the first control and the second control may be performed at the same time.

<Charging/Discharging Suppression Flow>

Figure 9:
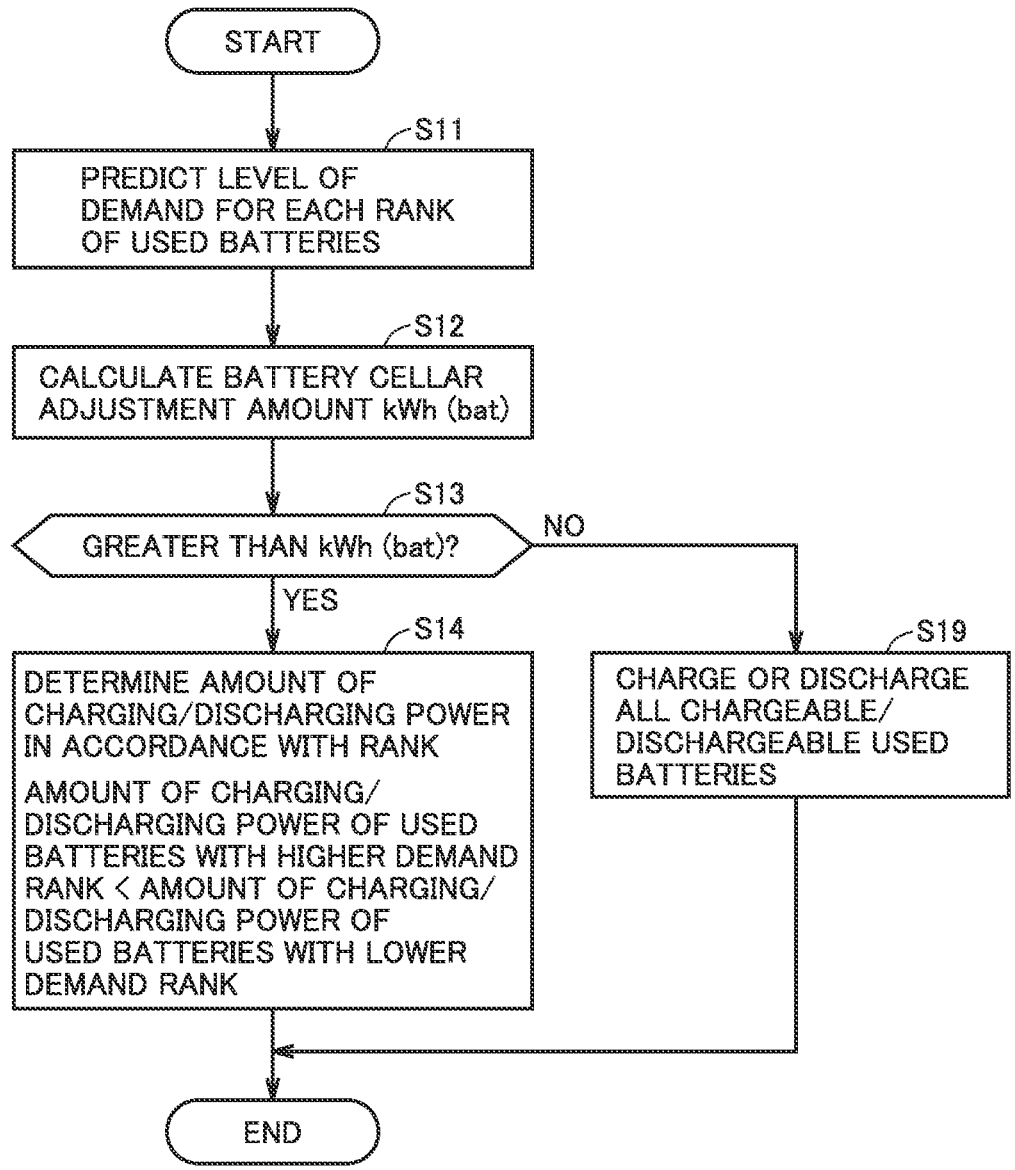
FIG. 9 is a flowchart illustrating a first example of a charging/discharging suppression procedure in the present embodiment.

FIG. 9 is a flowchart illustrating a first example of a charging/discharging suppression procedure in the present embodiment. This flowchart (and other flowcharts to be described later) is invoked from a main routine (not shown) and executed when a predetermined condition is satisfied. Each step is implemented by software installed the server 20, but it may be implemented by hardware (electrical circuits) arranged in the server 20. Hereinafter, the term of "step" is abbreviated as S.

In S11, the server 20 obtains a predicted level of demand for each rank of the used batteries 9. The level of demand for each rank is basically predicted based on the previous sales result of used batteries, and in addition to the previous sales result, a trend in the used battery market (such as a trend of prices of used batteries) may be taken into account. The server 20 may predict the level of demand for each rank of the used batteries 9 by itself, or may acquire the level of demand predicted by an external server (not shown) or the like.

In S12, the server 20 calculates the amount of electric power required by the battery cellar 2 to adjust the electric power exchanged between the battery cellar 2 and the power system 5. This amount of electric power is hereinafter referred to as the battery cellar adjustment amount, and is denoted as kWh (bat). An example method of calculating the battery cellar adjustment amount kWh (bat) will be described in detail with reference to FIG. 10.

In S13, the server 20 determines whether or not the total amount of electric power that may be charged to or discharged from all the used batteries 9 has a power surplus as compared with the battery cellar adjustment amount kWh (bat). If there is no power surplus, in other words, if the battery cellar adjustment amount kWh (bat) is greater than the total amount of electric power that may be charged to or discharged from all the used batteries 9 (NO in S13), in order to approximate the amount of electric power that may be charged to or discharged from the battery cellar 2 to the battery cellar adjustment amount ΔkWh (bat), it is required to charge or discharge all the used batteries 9. Accordingly, the server 20 charges or discharges all the used batteries 9 (S19).

On the other hand, if there is a power surplus, in other words, if the battery cellar adjustment amount kWh (bat) is smaller than the amount of electric power that may be charged to or discharged from all the used batteries 9 (YES in S13), it is possible to achieve the battery cellar adjustment amount ΔkWh (bat) without charging or discharging all the used batteries 9. In this case, the server 20 determines the amount of charging/discharging power and the charging/discharging frequency of each used battery 9 in accordance with the rank thereof (S14). More specifically, the server 20 reduces the amount of charging/discharging power of the used battery 9 with a higher demand rank (the rank A in the example of FIG. 6) smaller than the amount of charging/discharging power of the used battery 9 with a lower demand rank (the rank C).

Figure 10:
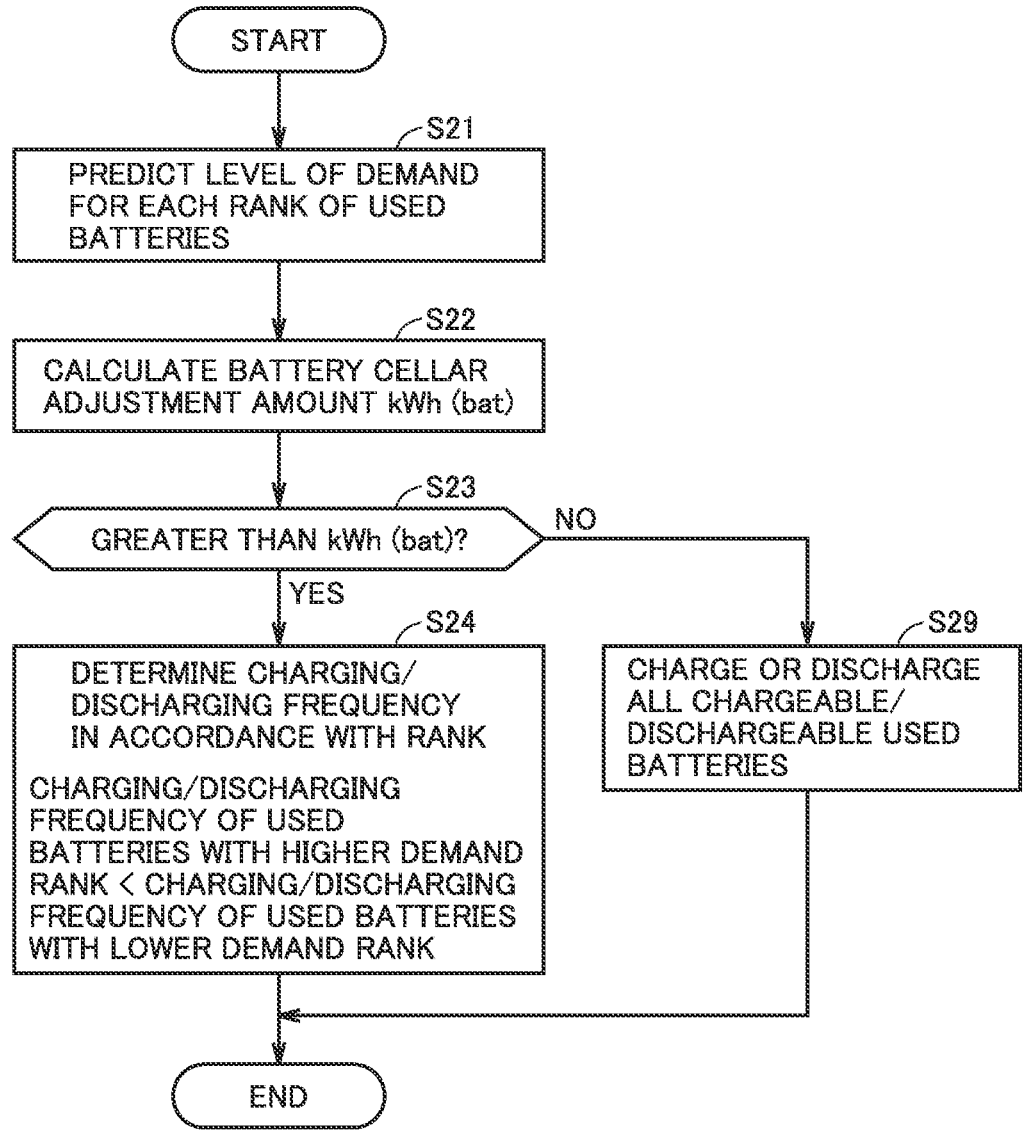
FIG. 10 is a flowchart illustrating a second example of a charging/discharging suppression procedure in the present embodiment.

FIG. 10 is a flowchart illustrating a second example of a charging/discharging suppression procedure in the present embodiment. Since the processes of S21 to S23 and S29 are the same as the processes of S11 to S13 and S19 illustrated in FIG. 9, the description thereof will not be repeated. As illustrated in FIG. 10, the server 20 may reduce the charging/discharging frequency of the used battery 9 with a higher demand rank smaller than the charging/discharging frequency of the used battery 9 with a lower demand rank (S24).

As described above, by reducing the amount of charging/discharging power for the power adjustment or the charging/discharging frequency of the used batteries 9 with a higher demand rank smaller than the used batteries 9 with a lower demand rank, it is possible to suppress the degradation caused by the charging/discharging. As a result, it is possible to maintain the used batteries 9 at a higher demand rank, which makes it possible to sufficiently stock the used batteries 9 with a higher demand rank.

Figure 11:
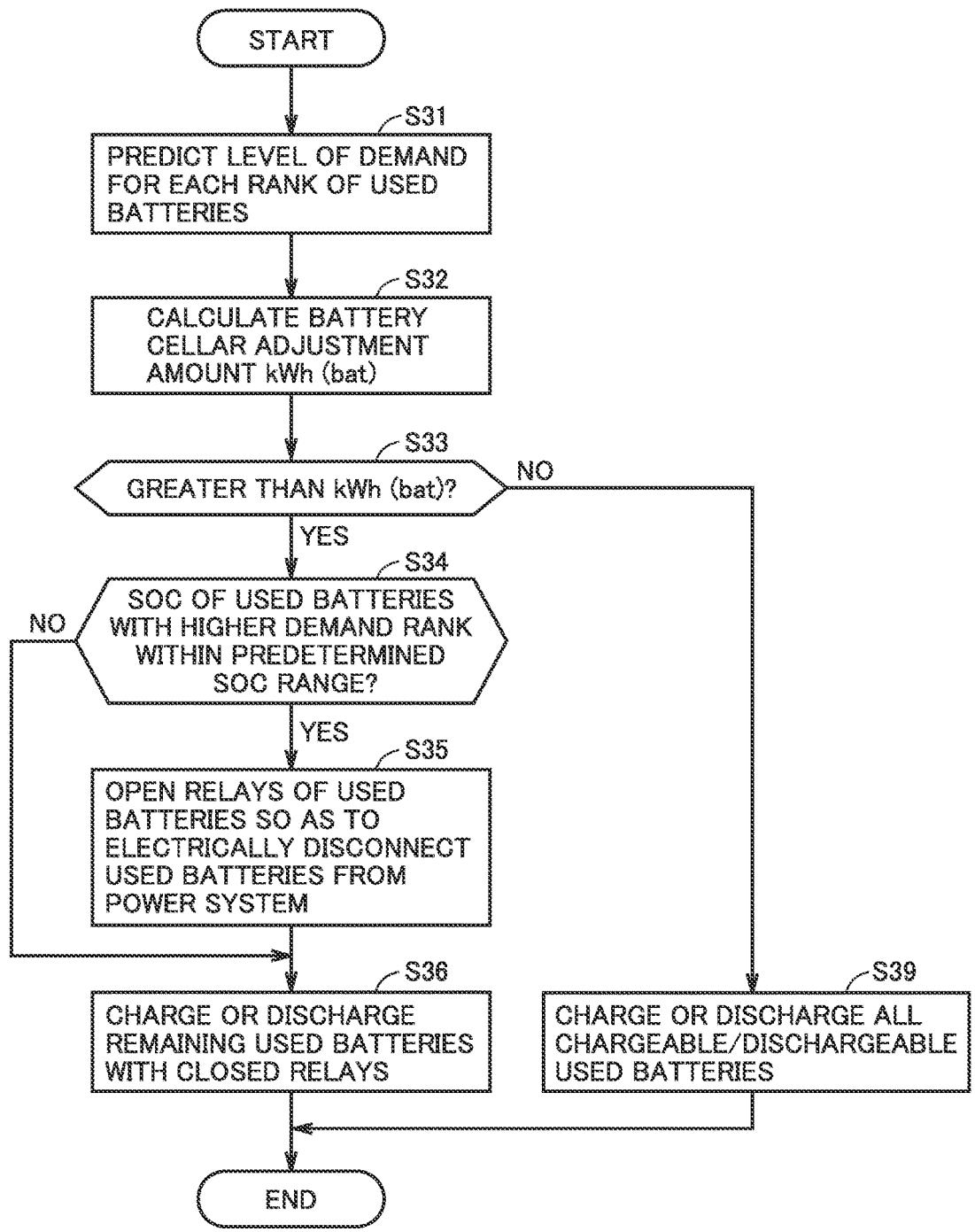
FIG. 11 is a flowchart illustrating a third example of a charging/discharging suppression procedure in the present embodiment.

FIG. 11 is a flowchart illustrating a third example of a charging/discharging suppression procedure in the present embodiment. Since the processes of S31 to S33 and S39 are the same as the processes of S11 to S13 and S19 illustrated in FIG. 9, the description thereof will not be repeated. If the total amount of electric power that may be charged to or discharged from all the used batteries 9 has a power surplus as compared with the battery cellar adjustment amount kWh (bat) (YES in S33), the server 20 proceeds the procedure to S34.

In S34, the sever 20 determines whether or not the SOC of each used battery 9 with a higher demand rank is within a predetermined SOC range. The SOC range is determined in advance according to the characteristics of the used batteries 9, and in the SOC range, the degradation of each used battery 9 progresses moderately. Generally, if the SOC of a secondary battery is excessively high (for example, more than 80%) or excessively low (for example, less than 20%), the degradation of the secondary battery tends to progress faster. Therefore, the SOC is preferably maintained within an intermediate SOC range (for example, an SOC range of 40% to 60%).

When the SOC of a used battery 9 among the used batteries 9 with a higher demand rank is within the SOC range in which the degradation progresses moderately (YES in S34), the server 20 opens the relays 213 corresponding to the used battery 9 so as to electrically disconnect the used battery 9 from the power system 5 (S35).

However, if the number of used batteries 9 electrically disconnected from the power system 5 is too large, the amount of electric power charged to or discharged from the battery cellar 2 may become smaller than the battery cellar adjustment amount kWh (bat). Therefore, it is preferable that the server 20 considers the battery cellar adjustment amount kWh (bat) when switching the relays 213. In other words, it is preferable that the server 20 adjusts the number of used batteries 9 electrically disconnected from the power system 5 so that the number of used batteries 9 required to achieve the battery cellar adjustment amount kWh (bat) are electrically connected to the power system 5.

In S36, the server 20 performs the power adjustment between the battery cellar 2 and the power system 5 by charging or discharging the remaining used batteries 9 among the used batteries 9 with a higher demand rank (the used batteries 9, the SOC of which is beyond the SOC range in which the degradation progresses moderately) which are electrically connected to the power system 5. The server 20 charges or discharges the used batteries 9 with a lower demand rank regardless of the SOC range. In addition, the higher the temperature of the used battery 9 is, the faster the used battery 9 degrades. Accordingly, the server 20 may limit the charging/discharging current so that the temperature of the used battery 9 will not be raised excessively high by the heat generated by the charging/discharging.

In this way, the used battery 9 electrically disconnected from the power system 5 by opening the relays 213 is not used in the charging/discharging for power adjustment, which makes it possible to suppress the degradation caused by the charging/discharging. In addition, the SOC of the used battery 9 electrically disconnected from the power system 5 is maintained within the SOC range in which the degradation progresses moderately. Thus, it is possible to suppress the degradation of battery during the storage period which is not caused by the charging/discharging (the so-called aging degradation or material degradation).

The process of S34 may also be applied to the flowchart of FIG. 9 and/or the flowchart of FIG. 10. Thereby, when the SOC of the used battery 9 is within the range in which the degradation progresses moderately, the server 20 may reduce the amount of charging/discharging power or the charging/discharging frequency of the used battery with a higher demand rank.

In any of the examples illustrated in FIGS. 9 to 11, the server 20 may suppress the charging/discharging of a used battery 9 which has been sold to a customer as compared with the charging/discharging of a used battery 9 which has the same rank as the former used battery but is not sold to a customer. In other words, the server 20 may suppress the charging/discharging of the used battery 9 which has been sold to a customer even if the used battery 9 has a lower demand rank (such as the rank C). As a result, it is possible to suppress the progress of degradation of the used battery during the storage period, which makes it possible to prevent the rank of a used battery from decreasing after the used battery has been sold to a customer.

<Degradation Evaluation>

Figure 12:
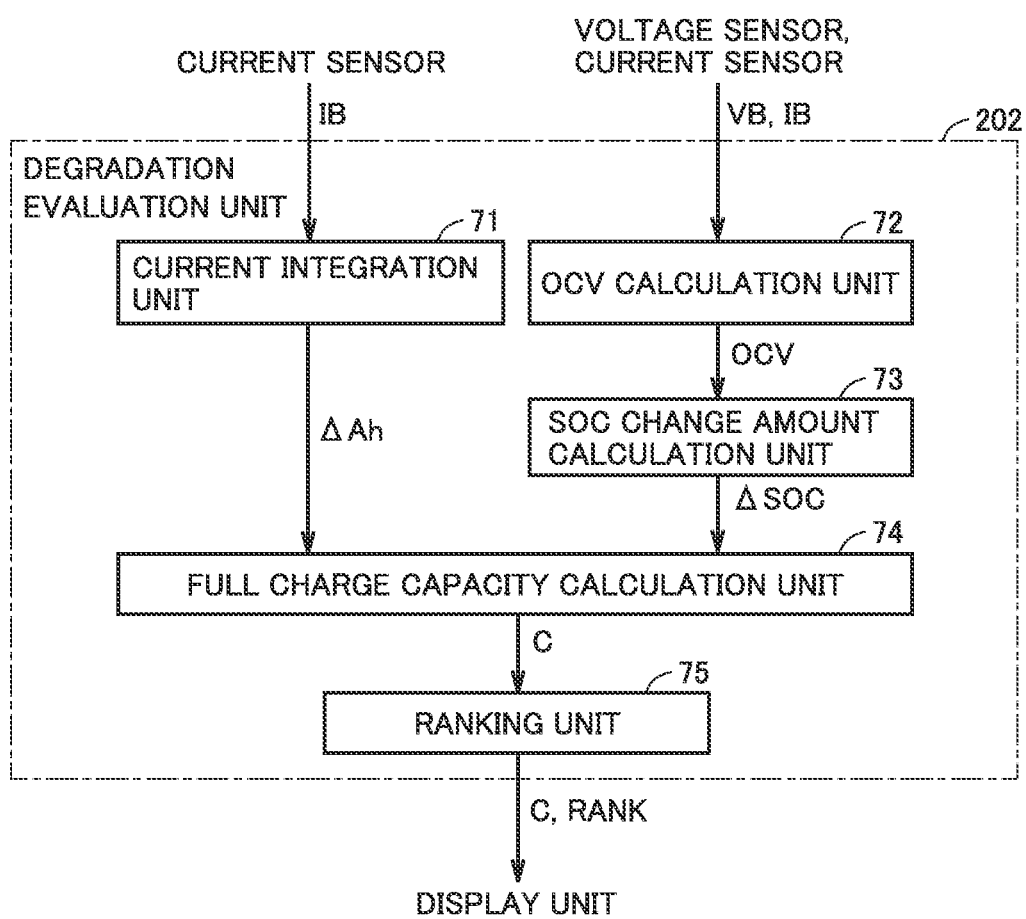
FIG. 12 is a functional block diagram illustrating a server which evaluates the degradation of a used battery.

FIG. 12 is a functional block diagram illustrating the server 20 (the degradation evaluation unit 202) which evaluates the degradation of the used batteries 9. Hereinafter, for the sake of simplification, the description will be carried out on a single used battery 9. In fact, when a plurality of used batteries 9 are waiting for the degradation evaluation, the degradation evaluation may be performed simultaneously on the plurality of used batteries 9. The degradation evaluation unit 202 includes a current integration unit 71, an open circuit voltage (OCV) calculation unit 72, an SOC change amount calculation unit 73, a full charge capacity calculation unit 74, and a ranking unit 75.

The current integration unit 71, based on the current IB detected by the current sensor 212, calculates an integrated value (integrated current) ΔAh (unit: Ah) of a current charged to or discharged from the used battery 9 during a period from a time when the start condition of current integration is satisfied to a time when the end condition of current integration is satisfied. As described above in the present embodiment, the charging/discharging of the used battery 9 is performed in response to a DR request from the company server 50, and the current flowing through the used battery 9 is integrated during the charging/discharging. More specifically, in the case of an increase DR request (power increase request), the used battery 9 is charged so as to increase the power demand of the battery cellar 2, and the charge current is integrated during the charging. On the other hand, in the case of a decrease DR request (power decrease request), the used battery 9 is discharged so as to reduce the power demand of the battery cellar 2, and the discharge current is integrated during the discharging. The current integration unit 71 outputs the integrated current ΔAh to the full charge capacity calculation unit 74.

The OCV calculation unit 72 calculates an OCV of the used battery 9 at the start of current integration and an OCV of the used battery 9 at the end of current integration. The OCV may be calculated according to the following expression (1), for example.

$$OCV = VB - \Delta Vp - IB \times R \quad (1)$$

In the expression (1), R represents an internal resistance of the used battery 9, and Vp represents a polarization voltage. At the start of current integration (immediately before the start of charging/discharging), the current IB=0. Further, before the start of current integration when the used battery 9 is not charged or discharged, the polarization voltage Vp≅0. Therefore, the OCV at the start of current integration may be calculated based on the voltage VB detected by the voltage sensor 211. The internal resistance R may be determined according to the relationship between the voltage VB and the current IB (the Ohm's law). When the charging/discharging of the used battery 9 is performed at a constant current, since the relationship between the current IB and the polarization voltage Vp may be measured in advance, the polarization voltage Vp may be determined from the current IB detected by the current sensor 212. Therefore, the OCV of the used battery 9 at the end of current integration may be calculated based on the voltage VB and the current IB. The OCV calculation unit 72 outputs the two calculated OCVs, i.e., the calculated OCV of the used battery 9 at the start of current integration and the calculated OCV of the used battery 9 at the end of current integration, to the SOC change amount calculation unit 73.

The SOC change amount calculation unit 73 calculates the SOC change amount ΔSOC of the used battery 9 from the start of current integration to the end of current integration based on the two calculated OCVs. A characteristic curve (OCV-SOC curve) indicating a relationship between the OCV and the SOC is preliminarily stored in the SOC change amount calculation unit 73. Thus, the SOC change amount calculation unit 73 reads an SOC corresponding to the OCV at the start of current integration and an SOC corresponding to the OCV at the end of current integration by referring to the OCV-SOC curve, and calculates the difference between the two SOCs as ΔSOC. The SOC change amount calculation unit 73 outputs the calculated ΔSOC to the full charge capacity calculation unit 74.

The full charge capacity calculation unit 74 calculates a full charge capacity C of the used battery 9 based on the ΔAh obtained from the current integration unit 71 and the ΔSOC obtained from the SOC change amount calculation unit 73. More specifically, the full charge capacity C of the used battery 9 may be calculated according to the following expression (2). Since an initial full charge capacity C0 may be obtained from the specifications of the used battery 9, the full charge capacity calculation unit 74 may calculate a capacity retention rate Q from the full charge capacity C and the initial full charge capacity C0 (Q=C/C0). The full charge capacity calculation unit 74 outputs the calculated full charge capacity C to the ranking unit 75.

$$C = \Delta Ah / \Delta SOC \times 100 \quad (2)$$

The ranking unit 75 ranks each used battery 9 according to the full charge capacity C. The ranking unit 75 may record the time where each used battery 9 is ranked as the degradation evaluation time in the battery data (see FIG. 5).

The rank of the used battery 9 is displayed on the display unit 205 together with the battery ID, the storage position of the used battery 9 and the like. As a result, when a request to purchase the used battery 9 is received from the customer 3, an employee of the battery cellar 2 may take out the used battery 9 having a rank corresponding to the request of the customer 3 from the storage position. By appropriately taking out the used batteries that have been sold from the storage cabinet 21, it is possible to keep a free space in the storage cabinet 21.

The method of calculating the full charge capacity C is merely an example. Any method may be employed to calculate the full charge capacity C as long as the method uses the voltage VB and the current IB detected during the charging/discharging of the used battery 9. Instead of or in addition to the full charge capacity C, the ranking unit 75 may rank a used battery 9 based on another characteristics (such as the internal resistance R of a used battery 9 or the index ΣD indicating the deviation of the electrolytic solution concentration in a lithium ion battery). The ranking unit 75 may rank a used battery 9 based on the length of time during which the used battery 9 is charged or discharged and/or the number of times the used battery 9 is charged or discharged. The ranking unit 75 may rank a used battery 9 based on the elapsed time from the production of the used battery 9, although the determined rank may not be sufficiently accurate. The ranking unit 75 may rank a used battery 9 based on a combination of the factors mentioned above (such as the full charge capacity C, the internal resistance R, the index ΣD, the charging/discharging time, the number of charging/discharging times, the elapsed time from the production).

<Power Adjustment>

Figure 13:
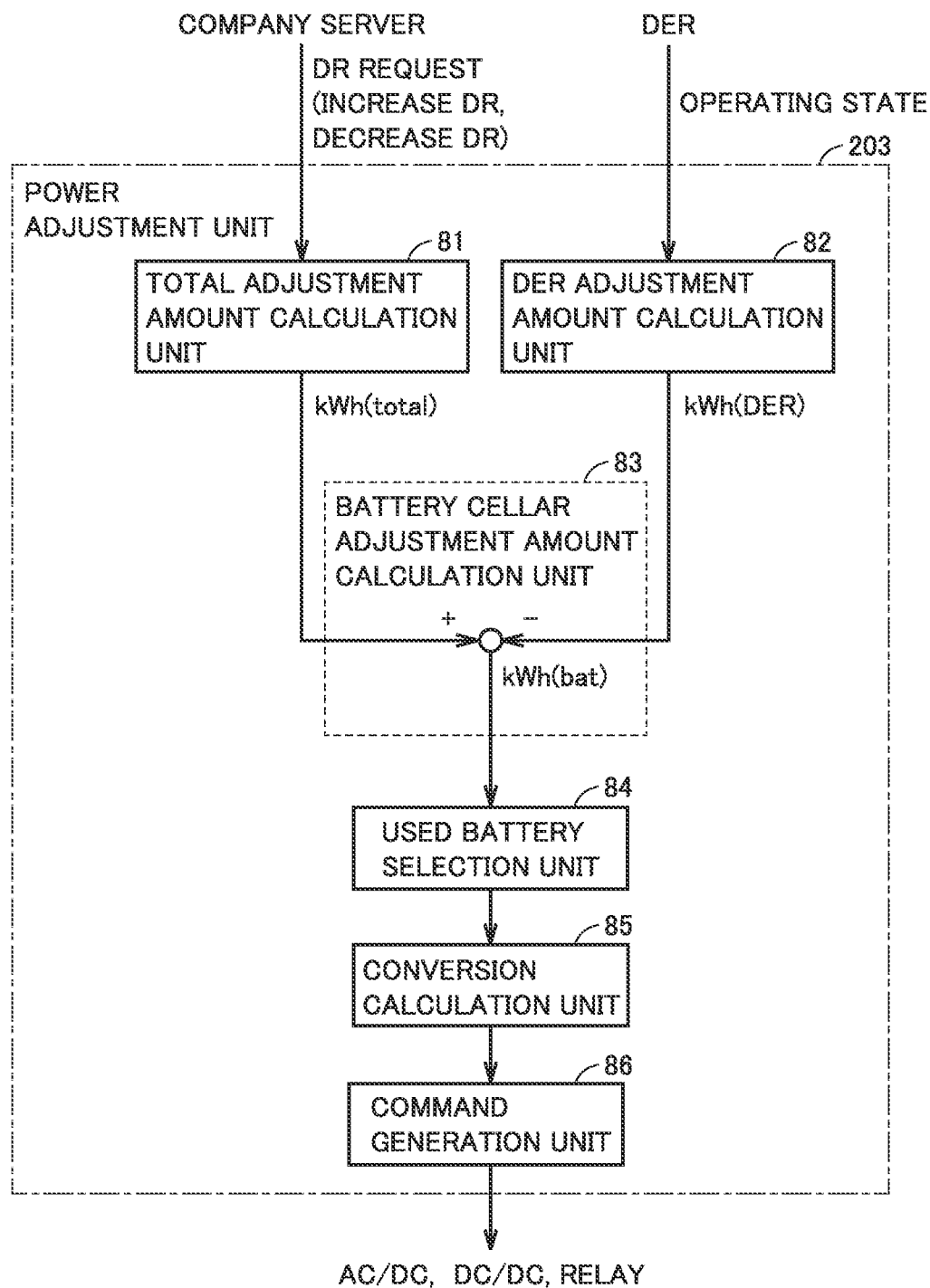
FIG. 13 is a functional block diagram illustrating a server which adjusts the electric power between a battery cellar and a power system.

FIG. 13 is a functional block diagram illustrating the server 20 (the power adjustment unit 203) which adjusts the electric power between the battery cellar 2 and the power system 5. In the present embodiment, for the sake of easy understanding, the description is carried out on the assumption that the DER 6 is a power generation DER (in particular, a naturally fluctuating power source such as a solar power facility). The power adjustment unit 203 includes a total adjustment amount calculation unit 81, a DER adjustment amount calculation unit 82, a battery cellar adjustment amount calculation unit 83, a used battery selection unit 84, a conversion calculation unit 85, and a command generation unit 86.

Upon receipt of a DR request from the company server 50, the total adjustment amount calculation unit 81 calculates a total amount of electric power that is required by the battery cellar 2 and the DER 6 to perform the power adjustment during a predetermined period (for example, 30 minutes). This amount of electric power is hereinafter referred to as the total adjustment amount, and is denoted as kWh (total). The total adjustment amount calculation unit 81 outputs the calculated kWh (total) to the battery cellar adjustment amount calculation unit 83.

The DER adjustment amount calculation unit 82 acquires the operating state of each DER 6 (more specifically, the expected amount of electric power generated by each DER 6 during a predetermined period) through the communication with the DER 6. This amount of electric power is hereinafter referred to as the DER adjustment amount, and is denoted as kWh (DER). The DER adjustment amount calculation unit 82 outputs the acquired kWh (DER) to the battery cellar adjustment amount calculation unit 83.

Based on the kWh (total) obtained from the total adjustment amount calculation unit 81 and the kWh (DER) obtained from the DER adjustment amount calculation unit 82, the battery cellar adjustment amount calculation unit 83 calculates the amount of electric power required by the battery cellar 2 to perform the power adjustment. This amount of electric power is hereinafter referred to as the battery cellar adjustment amount, and is denoted as kWh (bat). The battery cellar adjustment amount calculation unit 83 calculates the difference between the two amounts of power, i.e., ΔkWh=kWh (total)−kWh (DER), as the battery cellar adjustment amount kWh (bat). The battery cellar adjustment amount calculation unit 83 outputs the calculated kWh (bat) to the used battery selection unit 84.

The used battery selection unit 84 obtains an amount of electric power that may be charged to or discharged from each of the plurality of used batteries 9 stored in the plurality of storage cabinets 21 (see the battery data in FIG. 5). The used battery selection unit 84 selects a used battery from the plurality of used batteries 9 to perform the power adjustment based on the kWh (bat) obtained from the battery cellar adjustment amount calculation unit 83. When kWh (bat)>0, the power shortage of the power system 5 is compensated by the electric power discharged from the used batteries in the battery cellar 2. Therefore, the used battery selection unit 84 selects a number of used batteries 9 capable of discharge an amount of electric power equal to or greater than the kWh (bat). On the other hand, when kWh (bat)<0, the power surplus of the power system 5 is absorbed by charging the used batteries in the battery cellar 2. Therefore, the used battery selection unit 84 selects a number of used batteries 9 that may be charged with an amount of electric power equal to or greater than the kWh (bat) (absolute value). The used batteries 9 may be selected in such a manner that the used batteries 9 with a lower demand rank will be preferentially charged or discharged, whereas the used battery 9 with a higher demand rank will not be charged or discharged as much as possible. The details of the process have been described in detail with reference to FIGS. 9 to 11, and therefore, the description thereof will not be repeated. The used battery selection unit 84 outputs the selected used batteries 9 and the amount of electric power assigned to each of the selected used batteries 9 (the amount of electric power that may be adjusted by each used battery 9) to the conversion calculation unit 85.

The conversion calculation unit 85 calculates the electric power to be charged to or discharged from each used battery 9 selected by the used battery selection unit 84. More specifically, the conversion calculation unit 85, based on the remaining time of the power adjustment, converts the amount of electric power (unit: kWh) which may be adjusted by using the used battery 9 into the electric power (unit: kW) to be charged to or discharged from each used battery. For example, if the power adjustment amount assigned to a used battery 9 is 10 kWh, and the remaining time of the power adjustment is 15 minutes (0.25 h), the electric power to be charged to or discharged from each used battery may be calculated as 40 kW (=10 kWh/0.25 h). The conversion calculation unit 85 outputs the electric power to be charged to or discharged from each used battery 9 to the command generation unit 86.

The command generation unit 86, based on the calculation result obtained from the conversion calculation unit 85, generates a charging/discharging command to the AC/DC converter 22 and the DC/DC converter 23, and generates an open/close command to the relay 213. More specifically, the command generation unit 86 generates an open/close command so as to electrically connect the selected used batteries 9 to the DC/DC converter 23 or electrically disconnect the unselected used batteries 9 from the DC/DC converter 23. The command generation unit 86 generates the charging/discharging command so as to charge a total amount of electric power to the selected used batteries 9 or discharge the total amount of electric power from the selected used batteries 9.

Note that the power adjustment method illustrated in FIG. 13 is merely an example. In the present embodiment, it is assumed that the DER 6 is a power generation DER, and specifically a naturally fluctuating power source, the power output of which cannot be controlled. Therefore, the battery cellar adjustment amount calculation unit 83 calculates the battery cellar adjustment amount kWh (bat) as the difference [kWh (total)−kWh (DER)] between the total adjustment amount kWh (total) and the DER adjustment amount kWh (DER). In other words, in the present embodiment, after the DER adjustment amount kWh (DER) is determined, the final power adjustment is performed by using the battery cellar adjustment amount kWh (bat). However, for example, when the DER 6 is a storage DER, the battery cellar adjustment amount calculation unit 83 may assign the total adjustment amount kWh (total) to the DER adjustment amount kWh (DER) and the battery cellar adjustment amount kWh (bat), and perform the power adjustment using both the DER adjustment amount kWh (DER) and the battery cellar adjustment amount kWh (bat).

As described above in the present embodiment, the degradation degree of each used battery 9 stored in the storage cabinet 21 is evaluated. Thus, it is possible to effectively utilize the used batteries 9 during the storage period. Further, the charging/discharging of the used battery 9 for evaluating the degradation degree of each used battery 9 is basically performed in response to a DR request from the company server 50. When the number of the used batteries 9 is large, a large amount of electric power is charged or discharged, and the large amount of electric power is exchanged between the battery cellar 2 and the power system 5 in response to a DR request from the company server 50. Thus, the operator of the battery cellar 2 may receive a payment (an incentive) from the power company, and may use the payment as the running cost to run the battery cellar 2. Alternatively, the operator of the battery cellar 2 may recover a part of the initial investment (initial cost) of the battery cellar 2. Thus, it is possible to effectively utilize the used batteries 9 during the storage period for saving money.

Further, in the present embodiment, the charging/discharging of the used battery 9 with a higher demand rank is suppressed as compared with the charging/discharging of the used battery 9 with a lower demand rank. As a result, it is possible to suppress the degradation caused by the charge or discharge. As a result, it is possible to maintain the used batteries 9 at a higher demand rank, which makes it possible to sufficiently stock the used batteries 9 with a higher demand rank.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A battery management system comprising:
a storage cabinet that stores a plurality of batteries until the plurality of batteries are shipped;
a power converter electrically connected between the plurality of batteries stored in the storage cabinet and a power system; and
a controller that controls the power converter to perform (i) a degradation evaluation on each of the plurality of batteries and (ii) a demand adjustment of the power system using the plurality of batteries, the demand adjustment including, in response to a demand response request from the power system, charging or discharging the plurality of batteries, wherein.
the controller:
ranks each of the plurality of batteries based on a result of the degradation evaluation,
obtains a predicted level of sales demand for each rank of the plurality of batteries, and
suppresses, based on the level of sales demand, charging/discharging of a first battery as compared with charging/discharging of a second battery, the first battery being a battery with a higher demand rank among the plurality of batteries, and the second battery being a battery with a lower demand rank among the plurality of batteries, wherein
the controller suppresses charging/discharging of a third battery which has been sold to a customer as compared with charging/discharging of a fourth battery which is not sold to a customer, and
the third battery and the fourth battery have the same rank.

2. The battery management system according to claim 1, wherein
the controller reduces an amount of charging/discharging power of the first battery within a predetermined period smaller than an amount of charging/discharging power of the second battery within the predetermined period.

3. The battery management system according to claim 1, wherein
the controller reduces a charging/discharging frequency of the first battery smaller than a charging/discharging frequency of the second battery.

4. The battery management system according to claim 1, further comprising a switch that electrically connects each of the plurality of batteries to or electrically disconnects each of the plurality of batteries from the power system, wherein
the controller controls the switch to electrically disconnect the first battery from the power system.

5. The battery management system according to claim 1, wherein
the controller suppresses charging/discharging of the first battery as compared with charging/discharging of the second battery when an SOC of the first battery is within a predetermined SOC range in which a progress of degradation of the first battery is suppressed.

6. A battery management method using a server, comprising:
performing, by the server, a degradation evaluation on each of a plurality of batteries stored in a storage cabinet until shipment;
performing a demand adjustment of a power system using the plurality of batteries, the demand adjustment including causing the server to charge or discharge the plurality of batteries in response to a demand response request from a power system;
ranking each of the plurality of batteries based on a result of the degradation evaluation;
obtaining a predicted level of sales demand for each rank of the plurality of batteries, and
in the step of causing the server to charge or discharge the plurality of batteries, the server being caused to suppress, based on the level of sales demand, charging/ discharging of a battery with a higher sales demand rank among the plurality of batteries as compared with charging/discharging of a battery with a lower sales demand rank among the plurality of batteries, wherein suppressing charging/discharging of a third battery which has been sold to a customer as compared with charging/discharging of a fourth battery which is not sold to a customer, and
the third battery and the fourth battery have the same rank.

* * * * *